United States Patent [19]
McPherson

[11] Patent Number: 5,553,299
[45] Date of Patent: Sep. 3, 1996

[54] PROGRAMMING/REPROGRAMMING A POINT TO POINT COMMUNICATION APPARATUS

[75] Inventor: Andrew D. McPherson, Cambridge, England

[73] Assignee: U.S. Philips Corporation, New York, N.Y.

[21] Appl. No.: 252,503

[22] Filed: Jun. 1, 1994

[30] Foreign Application Priority Data

Jun. 2, 1993 [GB] United Kingdom .................. 9311379

[51] Int. Cl.$^6$ .................................................. G06F 13/00
[52] U.S. Cl. .................. 395/800; 395/430; 304/232.91; 304/DIG. 1
[58] Field of Search ...................................... 395/800, 750, 395/430; 359/152; 364/232.91, DIG. 1

[56] References Cited

U.S. PATENT DOCUMENTS

| | | | |
|---|---|---|---|
| 4,040,727 | 8/1977 | Ketchpel | 359/634 |
| 4,754,275 | 6/1988 | Abbaticchio et al. | 340/825.44 |
| 4,771,399 | 9/1988 | Snowden | 395/750 |
| 5,218,466 | 6/1993 | Brooks | 359/152 |

FOREIGN PATENT DOCUMENTS 59-169237  9/1984  Japan .

OTHER PUBLICATIONS

G. W. McClurg, "Two–Way IR SCI Through Pager Housing or LCD" Motorola Inc. Technical Developments, vol. 16, Aug. 1992, pp. 20–21.

C. R. Long, "Using an Infrared Sensor to Program Pagers", Motorola Inc. Technical Developments, vol. 16, Aug. 1992, pp. 61–62.

Primary Examiner—Alyssa H. Bowler
Assistant Examiner—John Harrity
Attorney, Agent, or Firm—Eugene J. Rosenthal

[57] ABSTRACT

A point to point communication apparatus, such as a digital radiopager (RP), having a non-volatile electrically programmable store which stores a radio identification code (RIC) or apparatus configuration information. The store can be programmed/reprogrammed by sending coded light signals to a light sensor. The coded programming/reprogramming light signals are supplied from an external source, such as a personal computer, and conform to a protocol which on being recognized causes a controller to permit access to the programmable store. The light sensor may also be used to sense the ambient light and control energization of a back light of a LCD panel.

11 Claims, 5 Drawing Sheets

PROGRAMMING/REPROGRAMMING A POINT TO POINT COMMUNICATION APPARATUS

BACKGROUND OF THE INVENTION

1. Field of the Invention

The present invention relates to programming and/or reprogramming of data stored in a point to point communication apparatus, particularly a portable communication apparatus such as a radiopager. It further relates to the combination of a programming apparatus and a point to point communication apparatus.

2. Description of the Realted Art

It is customary to program, reprogram or read a program store coupled to a microcontroller in a portable point to point radio apparatus, such as a radiopager, either by means of electrical contacts provided in the pager, for example in the battery compartment, or by over-air messages carrying a special identification which causes the processor to permit access to the RIC or configuration store. The use of electrical contacts has the disadvantages of reliability due to wear and contamination, cost of supply and fitting and the need to partially disassemble the equipment to gain access to them. Over air programming or reprogramming requires the provision of a pre-programmed default condition, and special radio identification code (RIC). This technique has a disadvantage that, due to falsing on error correction of a message, an equipment can be reprogrammed accidentally or incorrectly.

SUMMARY OF THE INVENTION

An object of the present invention is to program or reprogram a point to point communications apparatus in a reliable but cost effective manner.

According to one aspect of the present invention there is provided a point to point communication apparatus comprising radio receiving means, signal decoding means coupled to the radio receiving means, processing means for controlling the operation of the radio receiving means and the decoding means, a program memory coupled to the processing means, an electrically programmable store coupled to the processing means, optical radiation sensing means coupled to the processing means for providing an electrical version of received optical radiation, the processing means in response to recognising electrical versions of coded optical radiation signals received by the sensing means, causing said electrically programmable store to be programmed or reprogrammed.

According to a second aspect of the present invention there is provided a combination of a programming apparatus and a point to point communication apparatus, the programming apparatus comprising a controller, means for inputting program data coupled to the controller, an optical radiation emitting device and means coupled to the controller and the optical radiation emitting device for providing a version of the program data suitable for transmission by the optical radiation emitting device, and the communication apparatus comprising radio receiving means, signal decoding means coupled to the radio receiving means, processing means for controlling the operation of the radio receiving means and decoding means, a program memory coupled to the processing means, an electrically programmable store coupled to the processing means, optical radiation sensing means coupled to the processing means for providing an electrical version of received optical radiation, and means for providing an optical interface between the optical radiation emitting device and the optical radiation sensing means, the processing means in response to recognising electrical versions of coded optical radiation signals received by the sensing means causing said electrically programmable store to be programmed or reprogrammed.

Programming/reprogramming the electrically programmable store using optical radiation signals avoids the disadvantages noted above in respect of the known techniques. The electrically programmable store may comprise a radio identification code (RIC) and/or configuration store.

If desired the communication apparatus may comprise light emitting means, driver means having an input coupled to the processing means and an output coupled to the light emitting means, whereby the processing means causes optical signals to be emitted in response to reading-out of the RIC or configuration store. The provision of light emitting means enables signals to be read-out from the RIC or configuration store in a reliable manner, thus enabling verification of programmed data.

The apparatus may further comprise a LCD panel for displaying data, drive means for driving the LCD panel, the drive means being coupled to the processing means and means for back lighting the LCD panel, wherein the output of the optical radiation sensing means is also used by the processing means to sense ambient light conditions, said processing means causing the back lighting means to be energised when data is to be displayed on the LCD panel under adverse ambient light conditions. In such an apparatus the optical radiation sensing means serves a dual function which avoids having to provide a second light sensing means on the housing of the apparatus where space is a premium.

It is known from U.S. Pat. No. 4,754,275 to provide a pager with a LCD panel with a back light to permit viewing under adverse lighting conditions and a light sensor to enable the ambient light to be monitored and thereby the energisation of the back light to be controlled.

JP 59-169237 discloses a contactless connection system for optically communicating data in both directions between a portable terminal and a data transmitter using specially provided light emitters and detectors which are juxtaposed when data is being transferred. There is no suggestion of transmitting programming or reprogramming data via an optical interface, and more particularly of using an already provided light detector so as to obtain the advantages of saving the cost of supplying and fitting an additional optical radiation detector on the casing, which on physically small equipments can be difficult.

BRIEF DESCRIPTION OF THE DRAWINGS

The present invention will now be described, by way of example, with reference to the accompanying drawings, wherein.

In the drawings, the same reference numerals have been used to indicate corresponding features.

DESCRIPTION OF THE PREFERRED EMBODIMENTS

Figure 1:
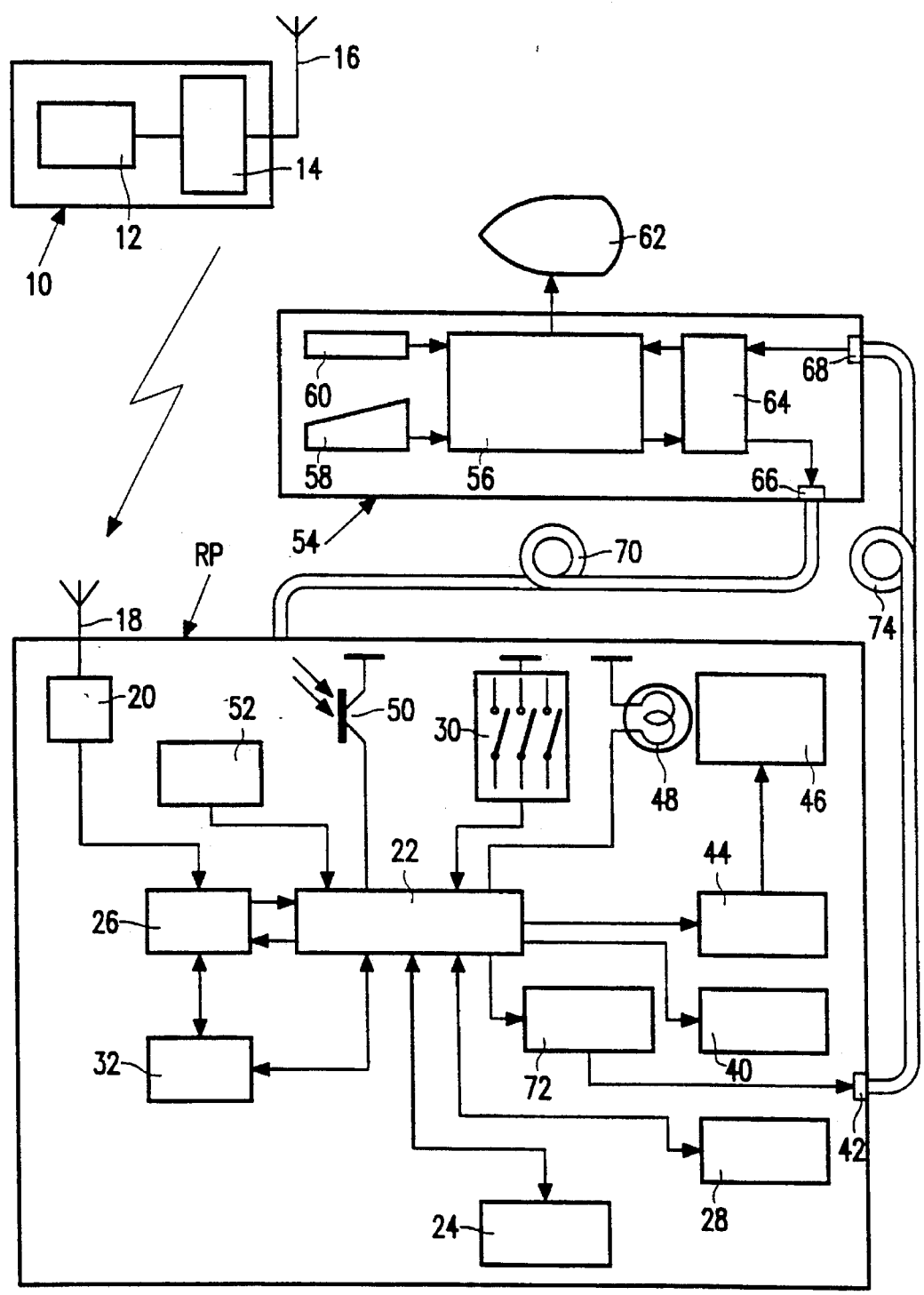
FIG. 1 is a block schematic diagram of a digital radiopaging system including a radiopager having a back lit LCD panel and a programmer optically coupled to the radiopager.

The radiopaging system shown in FIG. 1 comprises a base station 10 and a radiopager RP which is able to roam in and out of the radio coverage area of the base station 10.

The base station 10 comprises a controller 12, a radio transmitter 14 and an antenna 16. The controller 12 carries out a variety of tasks, known per se, including encoding and formatting address and data codewords in accordance with a predetermined protocol such as the CCIR Radiopaging Code No. 1 (otherwise known as POCSAG).

The radiopager RP comprises an antenna 18 coupled to a radio receiver 20, for example an integrated receiver type UAA 2080T produced and marketed by Philips Semiconductors. A decoder 26 is connected to the receiver 20 for decoding address and message codewords. A processor or controller 22 is connected to an output of the decoder 26. The decoder 26, for example an OM 1057 produced and marketed by Philips Semiconductors, performs a variety of tasks amongst which are switching the receiver on and off, synchronisation and error checking and correcting the received address and, if sent, message codewords. The controller 22 is controlled by software stored in a non-volatile program memory 24, such as an EPROM or masked ROM and processes messages received by the receiver and decoder for storage and subsequent display. Messages are stored in a random access memory (RAM) 28 for later recall. A keypad 30 is connected to the controller 22 for entering manual commands. An electrically programmable store 32 for storing one or more RICs assigned to the radiopager RP and pager configuration information is coupled to the decoder 26 which includes means for comparing the received address codewords with the or each RIC and in the event of a match the decoder 26 supplies an appropriate output signal to the controller 22. In operation, the receiver 20 is energised for the duration of a pre-determined frame and if a received RIC corresponds to the or one of those stored in the RIC store 32 then the controller 22 energises an annunciator 40 and/or a light emitting diode 42 thereby alerting a user to the receipt of a paging signal. If the received RIC is followed by data codewords, these are decoded in the decoder 26 and the result is either stored in the RAM 28 or displayed. The stored data is read-out of the RAM 28 in response to a command entered by way of the keypad 30 and supplied to a liquid crystal display (LCD) driver 44 which energises a LCD panel 46 accordingly.

A back light 48 is provided in order to be able to view data displayed on the LCD panel 46 under adverse lighting conditions, for example darkness. However since the back light 48 is not required under good lighting conditions and in order to conserve battery power, a light detector 50, for example a light sensitive transistor, is coupled to the controller 22. When the ambient light is below an arbitrary threshold level then the output of the light detector 50 causes the controller to energise the back light 48 when message information is displayed. A timer 52 is connected to the controller 22 and amongst its functions is that of causing the back light 48 to be energised for a predetermined period of time after which the back light 48 is switched-off to save battery power.

In order to program or reprogram the radiopager RP, that is enter or alter the software in the RIC or configuration store 32 and perhaps also a part of the program memory 24, a programmer 54 comprising a personal computer is coupled optically to the radiopager RP. The programmer 54 comprises a processor 56 to which is coupled a keyboard 58, a disk drive 60 for reading disks, a video display unit 62 and a modem 64 for encoding electrical signals to a form suitable for transmission by a light emitting diode (LED) 66 and decoding optical signals received by a photo sensitive device 68.

In accordance with the present invention, programming or reprogramming is carried by optically coupling the LED 66 to the light detector 50, for example by an optical fibre 70. The light detector 50 is coupled to the RIC store 32 by the controller 22 in response to relatively high rate, for example 1200 baud and greater, pulse signals being received. The pulse repetition rate and protocol of the light signals from the LED 66 is such that for example the mains flicker from a fluorescent lamp is not interpreted as a coded signal. Thus depending on the current status of the radiopager RP, the light detector 50 serves either one of two functions. In a non-illustrated embodiment of the present invention not having an ambient light detector or having a separate ambient light detector, the light detector 50 is provided for the sole purpose of being able of program/reprogram data in the RIC store 32.

Verification of any programming or reprogramming instructions are relayed optically to the programmer 54 using a LED driver 72 and the LED 42. An optical fibre 74 conveys the verification signals to the photosensitive device 68.

The optical sequences supplied by the LED 66 may be in accordance with a protocol which the controller 22 recognises as being suitable for programming or reprogramming the RIC store 32. Alternatively and/or additionally the keypad may be operated to select a special screen for programming or to place the pager in a special mode after which the optical interface is used to transfer programming data.

Figure 2:
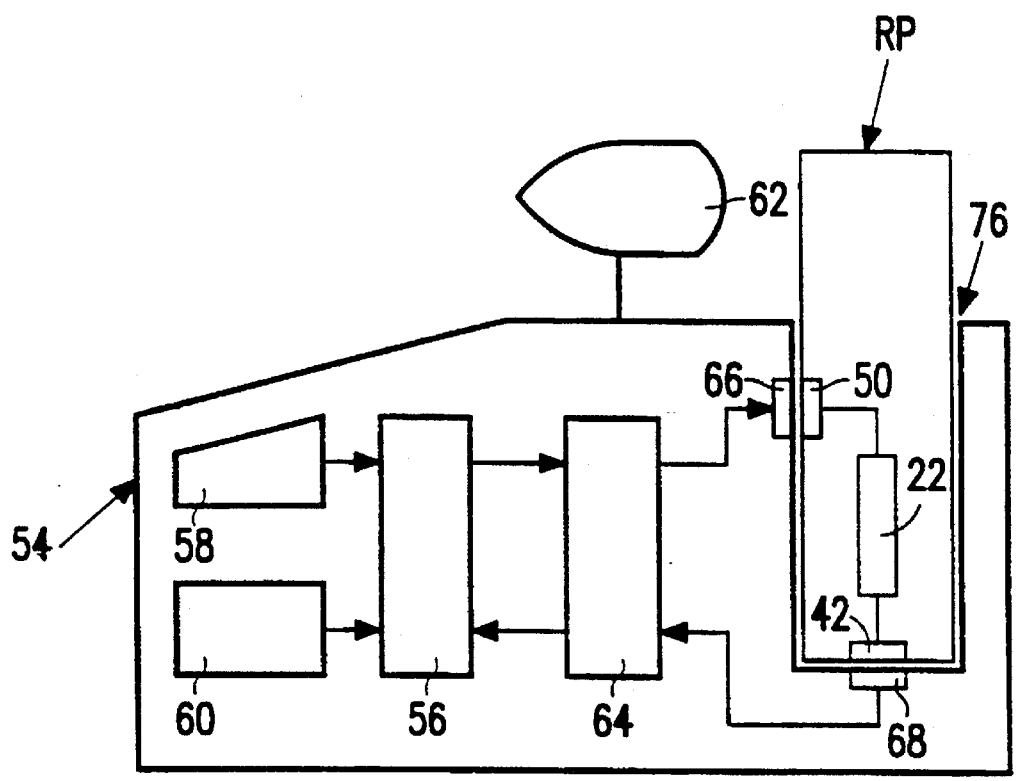
FIG. 2 is a block diagram of an alternative arrangement for programming/reprogramming the radiopager.

FIG. 2 illustrates a programmer 54 comprising a slot 76 of a size and shape to receive a radiopager RP. The walls of the slot 76 form a light shield. A LED 66 is disposed in a wall of the slot 76 so as to be opposite the light detector 50 and a photo sensitive device 68 is located in a wall of the slot 76 at a position opposite the LED 42. For the sake of completeness a controller 22 has been illustrated having connections to the light detector 50 and the LED 42.

The programming and/or reprogramming is carried out in a similar manner as with the arrangement shown in FIG. 1.

Figure 3:
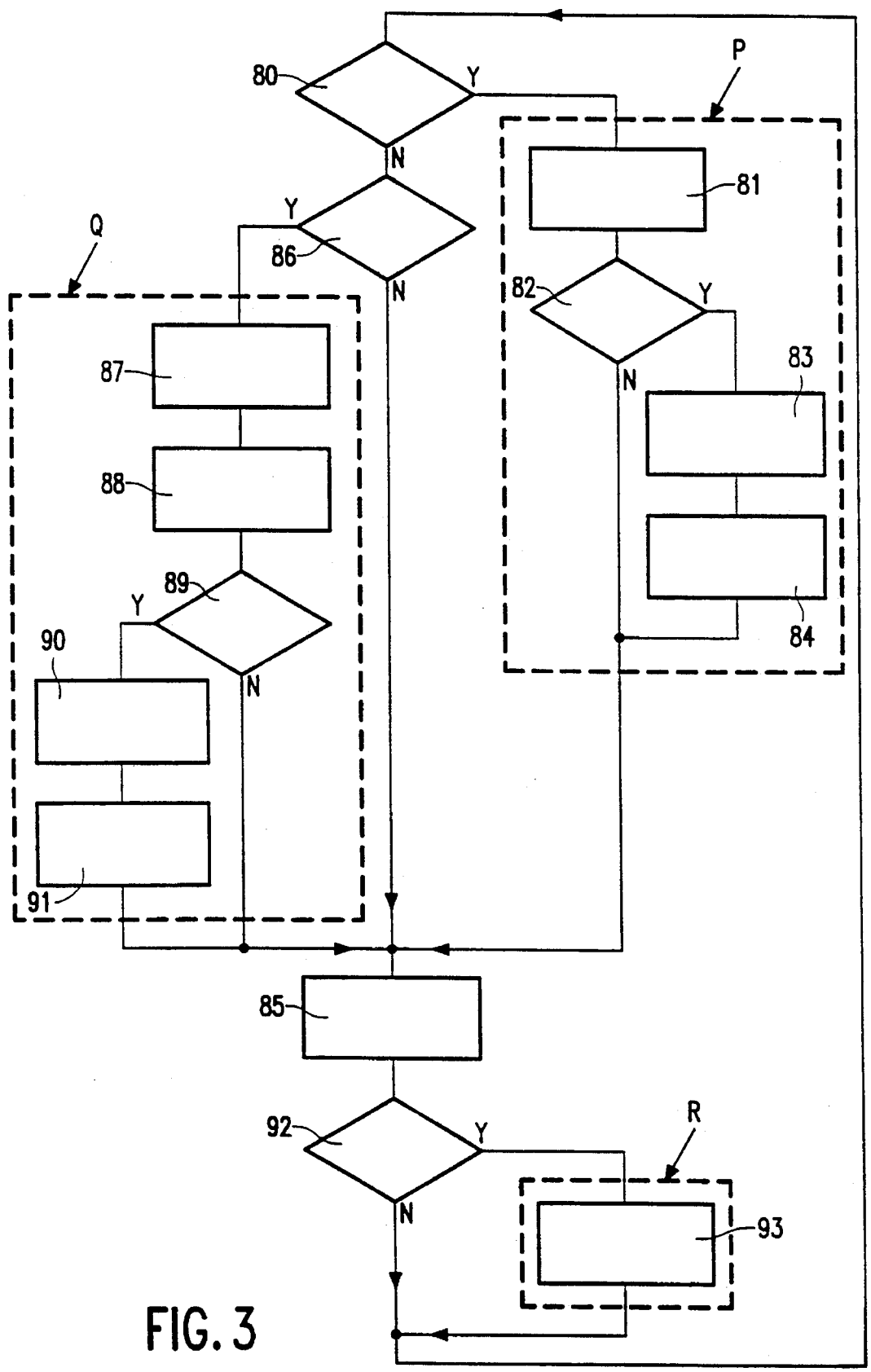
FIG. 3 is a flow chart relating to the normal operation of a back light in the radiopager.

FIG. 3 is a flow chart of the basic operation of the light detector 50 and the back light 48 when displaying a newly received message or a message read-out of the RAM 28 and supplied to the LCD driver 44. The controller 22 includes means for energising the back light 48 for a predetermined time period in response to a user actuating a switch to display the message. If the predetermined time period expires before the entire message has been read, then re-actuation of the switch will cause re-energisation of the back light 48 for another predetermined time period. The sub-routines identified as P, Q and R are also used in FIG. 4.

Referring to FIG. 3, the flow chart commences with a check being made to see if the read display switch has been actuated, block 80. If the answer is Yes (Y) then a sub-routine identified by the letter P is followed. This sub-routine commences with the block 81 which relates to displaying a message from the RAM 28 on the LCD panel 46. In block 82 a check is made if it is too dark for the message to be viewed. If the answer is Yes (Y), then in block 83, the back light 48 is energised. Simultaneously, in block 84, timer 52 is actuated to commence the time-out period for the energisation of the back light 48.

If the answer in the block 82 is No (N), then the flow chart from that block together with that from the block 84 proceeds to a process block 85 which relates to the process of incrementing the time out.

Reverting to the block 80, if the answer is No (N), then a check is made if a new paging message has been received, block 86. If the answer is No (N), then flow chart proceeds to the block 85. If the answer is Yes (Y) then a sub-routine identified by the letter Q is followed. This sub-routine commences with a block 87 which relates to the process of storing the newly received paging message in the RAM 28. Block 88 relates to the process of displaying the newly received paging message on the LCD panel 46. In block 89 a check is made to see if it is dark. If the answer is No (N) then the flow chart proceeds to the block 85. If the answer is Yes (Y), then in blocks 90,91, which correspond to the blocks 83,84, the back light 48 is energised and the timer 52 is actuated to commence the time out period. The flow chart then proceeds to the block 85.

Continuing from the process block 85, in a block 92 a check is made if the back light time out period has elapsed. If the answer is Yes (Y) then in block 93, identified as sub-routine R, the back light 48 is de-energised. If the answer is No (N) then the flow chart from that block and from the block 93 reverts to the block 80.

In the case of programming or reprogramming the radiopager, a data terminal, such as a programmer 54 (FIG. 1), is optically coupled to the light detector 50 for example by the optical fibre 70. Coded signals are then transmitted to the light detector 50 and passed to the controller 22. The transmission commences with a special sequence which on being recognised by the controller 22 causes it to access the RIC store 32 to enable it to be programmed/reprogrammed as required in accordance with the received data. In the event of a paging message being received by the receiver 20, it will be decoded and stored in the RAM 28. A tone only message will be treated normally and the annunciator 40 is energised.

Figure 4:
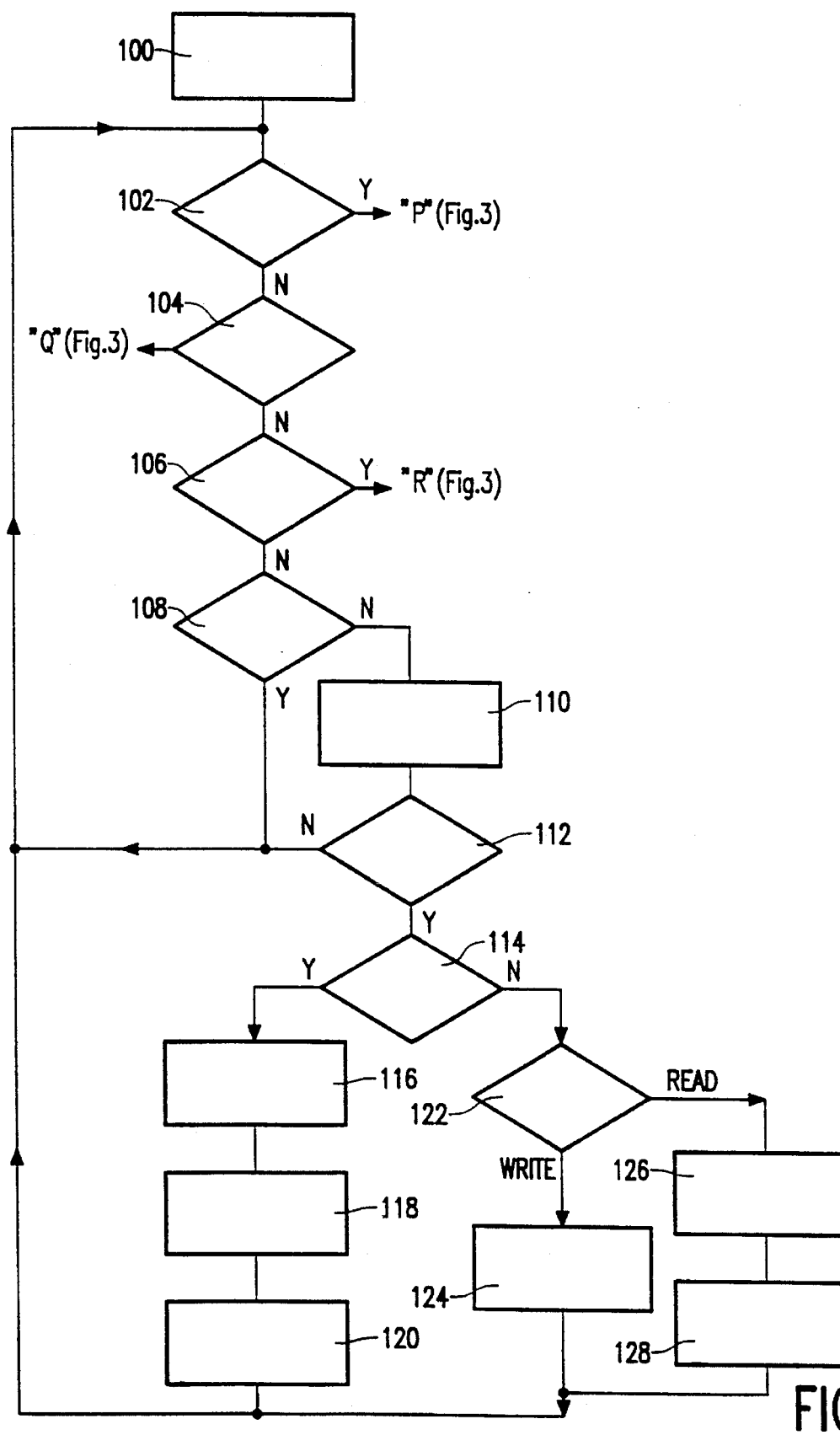
FIG. 4 is a flow chart relating to programming/reprogramming a RIC or configuration store of a radiopager using the ambient light detector.

FIG. 4 is a flow chart of the sequence of operations involved when the light detector 50 receives coded data for programming/reprogramming the RIC store 32. The flow chart begins at block 100 which relates to the operations of starting the timer 52 (FIG. 1) and receiving programming data. Block 102 relates to checking to see if the keypad 30 has been actuated to read out message data from the RAM 28. If the answer is Yes (Y) then the sub-routine P in FIG. 3 is followed. If the answer is No (N) then a check is made to see if a new call has been received, block 104. If the answer is Yes (Y) then the sub-routine Q in FIG. 3 is followed. If the answer is No (N) then a check is made in block 106 to see if the back light has timed out. If the answer is Yes (Y) then the sub-routine R in FIG. 3 is followed. A No (N) answer causes the flow chart to proceed to block 108 in which a check is made as to whether the data input timer has elapsed. If the answer is No (N) then in block 110 a check is made to see if the light detector 50 is receiving data. In block 112, a check is made to see if data has been detected. A No (N) answer from this block or a Yes (Y) answer from the block 108 causes the flow chart to revert to the block 102. A Yes (Y) answer from the block 112 leads to the block 114 in which a check is made to see if any commands have been received. A Yes (Y) answer leads to a block 116 which relates to the process of defining the store address. Block 118 relates to defining whether the instruction is a read/write instruction. Finally in this leg of the flow chart, the data input timer is reset. The flow chart then reverts to the block 102.

If the answer from the block 114 is No (N), a check is made to see if the command is a read or a write command. If the command is "write", the input data is stored at the addressed location, block 124. Thereafter the flow chart reverts to the block 102. If the command is "Read", data is read-out from the addressed locations, block 126, and is either displayed on the LCD panel 46 (FIG. 1) or supplied to LED driver 72 (FIG. 1), block 128. Thereafter the flow chart reverts to the block 102.

Figure 5:
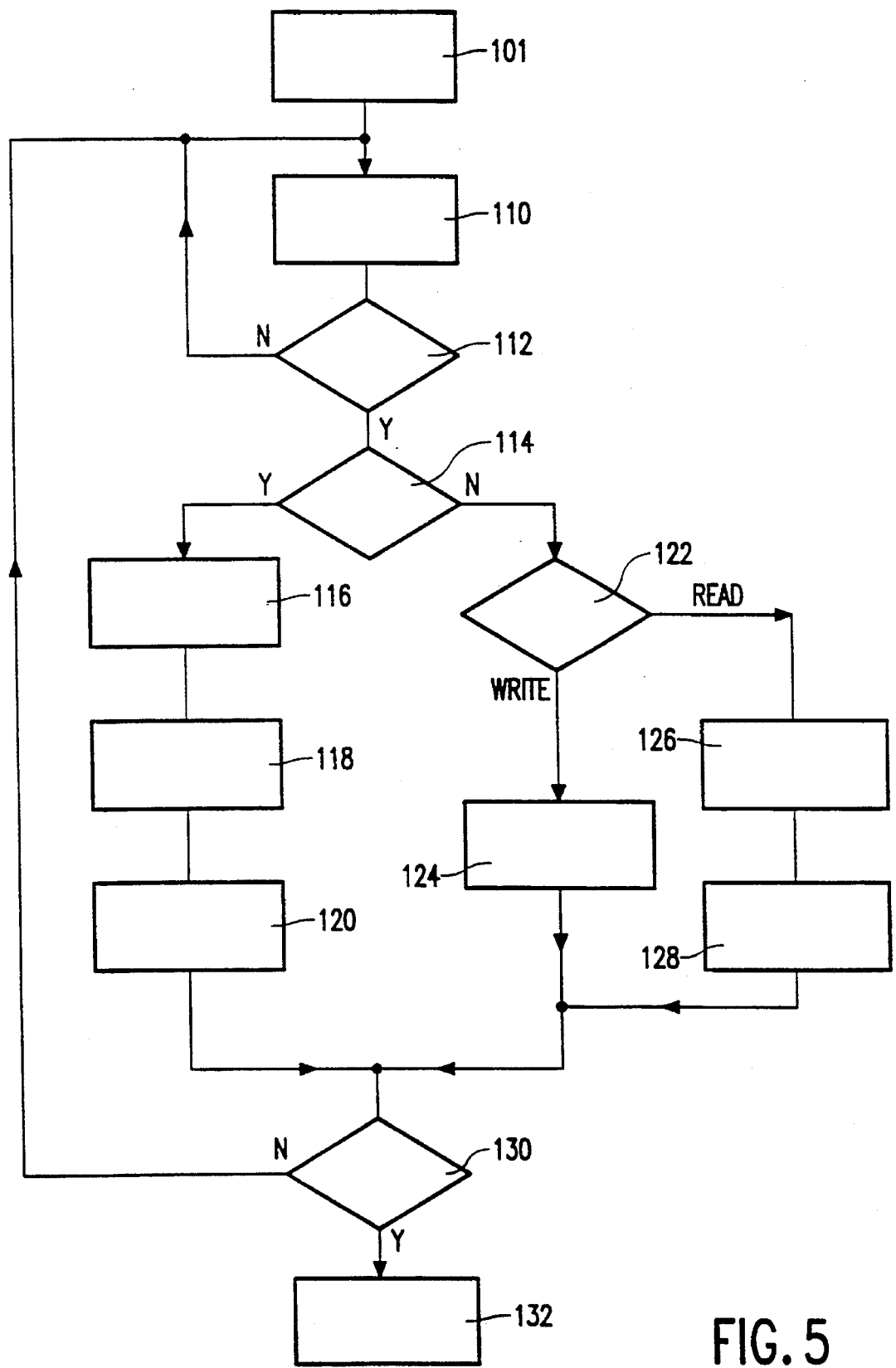
FIG. 5 is a flow chart relating to programming/reprogramming a RIC or configuration store of a radiopager not having an ambient light detector.

FIG. 5 is a flow relating to programming/reprogramming the RIC store of a pager which has a separate light detector for programming/reprogramming, no back light control for an LCD panel or no LCD panel for displaying numeric and alphanumeric messages, for example a tone only pager. This flow chart is a simplified version of that shown in FIG. 4 because the operations associated with back light control have been omitted as they are not required. In the interests of brevity the entire sequence of operations will not be described. However it is sufficient to say that the flow chart commences with a block 101 which relates to putting the pager in a programming mode. An output of this block 101 is coupled to the block 110 which relates to checking the light detector 50 for data input, block 110. A check is made in block 110 to see if data has been detected and if it has (Y) then the flow chart proceeds to block 114 as described previously. However if it has not (N), the flow chart reverts to block 110.

Blocks 126 and 128 relate to verifying that the data received by way of the optical interface is correct by either displaying it on the LCD panel 46, if provided, and/or relaying it back to the programmer 54 by way of the LED 42.

Finally, from the blocks 120, 124 and 128, the flow chart passes to a decision block 130 which relates to the step of checking whether the programmable mode has timed out. If the answer is No (N) the flow chart reverts to the block 110. However if the answer is Yes (Y) the flow chart proceeds to exit block 132.

Although the present invention has been described with reference to a radiopager, it is to be understood that the teachings of the present invention can be applied to any suitable point to point communication apparatus, such as a cordless or cellular telephone or a private mobile radio transceiver, irrespective of whether it has an LCD panel which can be back lit in response to a light sensor detecting poor ambient lighting conditions.

From reading the present disclosure, other modifications will be apparent to persons skilled in the art. Such modifications may involve other features which are already known in the design, manufacture and use of radio apparatus and component parts thereof and which may be used instead of or in addition to features already described herein.

I claim:

1. A point-to-point communication apparatus comprising radio receiving means, signal decoding means coupled to the radio receiving means, processing means for controlling the operation of the radio receiving means and the decoding means, a program memory coupled to the processing means, an electrically programmable store coupled to the processing means, optical radiation sensing means coupled to the processing means for providing an electrical version of received optical radiation, a liquid crystal display (LCD) panel for displaying data, drive means for driving the LCD panel, the drive means being coupled to the processing means, and means for back lighting the LCD panel;

the processing means being responsive to electrical versions of coded optical radiation signals received by the sensing means to cause said electrically programmable store to be programmed or reprogrammed and the output of the optical radiation sensing means also being used by the processing means to sense ambient light conditions, said processing means causing the back lighting means to be energized when data is to be displayed on the LCD panel under adverse ambient light conditions.

2. An apparatus as claimed in claim 1, characterised in that the electrically programmable store stores a radio identification code (RIC) apparatus configuration information.

3. An apparatus as claimed in claim 2, further comprising light emitting means and driver means having an input coupled to the processing means and an output coupled to the light emitting means, so that the processing means causes optical signals to be emitted in response to reading-out of the electrically programmable store.

4. An apparatus as claimed in claim 2, further comprising light emitting means and driver means having an input coupled to the processing means and an output coupled to the light emitting means, so that the processing means causes optical signals to be emitted in response to reading-out of the electrically programmable store.

5. A combination of a programming apparatus and a point to point communication apparatus; wherein the programming apparatus comprises
a controller,
means for inputting program data coupled to the controller,
an optical radiation emitting device and means coupled to the controller and the optical radiation emitting device for providing a version of the program data suitable for transmission by the optical radiation emitting device; and the communication apparatus comprises
radio receiving means,
signal decoding means coupled to the radio receiving means,
processing means for controlling the operation of the radio receiving means and decoding means,
a program memory coupled to the processing means,
an electrically programmable store coupled to the processing means,
optical radiation sensing means coupled to the processing means for providing an electrical version of received optical radiation,
means for providing an optical interface between the optical radiation emitting device and the optical radiation sensing means,
a liquid crystal display (LCD) panel for displaying data,
drive means for driving the LCD panel, the drive means being coupled to the processing means, and
means for back lighting the LCD panel;

the processing means being responsive to electrical versions of coded optical radiation signals received by the sensing means to cause said electrically programmable store to be programmed or reprogrammed and the output of the optical radiation sensing means also being used by the processing means to sense ambient light conditions, said processing means causing the back lighting means to be energized when data is to be displayed on the LCD panel under adverse ambient light conditions.

6. The combination as claimed in claim 5, characterised in that the electrically programmable store comprises a radio identification code (RIC) and/or configuration store.

7. The combination as claimed in claim 6, wherein the communication apparatus further comprises light emitting means and driver means having an input coupled to the processing means and an output coupled to the light emitting means, so that the processing means causes optical signals to be emitted in response to reading-out of the electrically programmable store; and the programming apparatus comprises a light sensor, modem means for decoding light signals detected by the light sensor and having an output coupled to the controller, means coupled to the controller for storing and/or displaying the decoded light signals, and means for providing an optical interface between the light emitting means and the light sensor.

8. The combination as claimed in claim 6 wherein the means for providing an optical interface comprises an optical fiber.

9. The combination as claimed in claim 5, wherein the communication apparatus further comprises light emitting means and driver means having an input coupled to the processing means and an output coupled to the light emitting means, so that the processing means causes optical signals to be emitted in response to reading-out of the electrically programmable store; and the programming apparatus comprises a light sensor, modem means for decoding light signals detected by the light sensor and having an output coupled to the controller, means coupled to the controller for storing and/or displaying the decoded light signals, and means for providing an optical interface between the light emitting means and the light sensor.

10. The combination as claimed in claim 9 wherein the means for providing an optical interface comprises an optical fiber.

11. The combination as claimed in claim 5, wherein the means for providing an optical interface comprises an optical fibre.

* * * * *